United States Patent
Pamakstis et al.

(10) Patent No.: US 10,900,819 B2
(45) Date of Patent: Jan. 26, 2021

(54) ULTRASONIC FLOWMETER

(71) Applicant: AXIOMA Metering, UAB, Kaunas (LT)

(72) Inventors: Virgilijus Pamakstis, Kaunas (LT); Rimas Wolyniec, Kauno raj. (LT); Gintautas Lengvinas, Kauno raj. (LT); Vainius Repsys, Kauno raj. (LT); Arminas Ragauskas, Kaunas (LT)

(73) Assignee: AXIOMA Metering, UAB (LT)

( * ) Notice: Subject to any disclaimer, the term of this patent is extended or adjusted under 35 U.S.C. 154(b) by 349 days.

(21) Appl. No.: 16/103,969

(22) Filed: Aug. 16, 2018

(65) Prior Publication Data

US 2020/0056915 A1 Feb. 20, 2020

(51) Int. Cl.
*G01F 1/66* (2006.01)

(52) U.S. Cl.
CPC .............. *G01F 1/662* (2013.01); *G01F 1/667* (2013.01)

(58) Field of Classification Search
CPC ................................. G01F 1/667; G01F 1/662
See application file for complete search history.

(56) References Cited

U.S. PATENT DOCUMENTS

| | | | |
|---|---|---|---|
| 4,232,548 A | 11/1980 | Baumoel | |
| 5,163,445 A | 11/1992 | Christian et al. | |
| 7,634,950 B2 | 12/2009 | Rhodes | |
| 8,806,957 B2 | 8/2014 | Laursen et al. | |
| 8,893,559 B2 | 11/2014 | Drachmann | |
| 8,928,137 B2 | 1/2015 | Skallebæk et al. | |
| 9,383,239 B2 | 7/2016 | Drachmann | |
| 9,494,452 B2 | 11/2016 | Drachmann | |
| 9,714,855 B2 * | 7/2017 | Bar-on | G01F 1/662 |
| 2007/0151363 A1 | 7/2007 | Ramsesh | |
| 2008/0083262 A1 * | 4/2008 | Augenstein | G01F 25/0007 73/1.16 |
| 2012/0006127 A1 | 1/2012 | Nielsen | |
| 2012/0031198 A1 | 2/2012 | Skallebaek et al. | |
| 2013/0139610 A1 | 6/2013 | Laursen et al. | |
| 2013/0205913 A1 | 8/2013 | Sorensen et al. | |
| 2014/0216167 A1 | 8/2014 | Nielsen et al. | |

(Continued)

FOREIGN PATENT DOCUMENTS

| | | |
|---|---|---|
| DK | 201270015 A | 2/2013 |
| EP | 1742024 A1 | 1/2007 |

(Continued)

*Primary Examiner* — Eman A Alkafawi
(74) *Attorney, Agent, or Firm* — Forge IP, PLLC

(57) ABSTRACT

An ultrasonic flow meter includes a flow tube, and first and second ultrasound transducers that transmit ultrasonic pulses through a liquid flowing through the tube. The flow tube includes a reflector assembly that reflects pulses from the first transducer to the second transducer, and from the second transducer to the first transducer, thereby facilitating different sequences of time-of-flight measurements. A microcontroller obtains multiple sequences of measurements, where all the measurements in a single sequence are of the same measurement type, and each sequence uses a different type of measurement than that used by the other sequences. The microcontroller filters out the longest and shortest time-of-flights and, using an average of the remaining time-of-flights, calculates a volumetric flow rate of the fluid.

17 Claims, 18 Drawing Sheets

(56) References Cited

U.S. PATENT DOCUMENTS

| | | |
|---|---|---|
| 2014/0338465 A1 | 11/2014 | Skallebaek et al. |
| 2015/0013472 A1* | 1/2015 | Gill .................. G01F 1/662 73/861.31 |
| 2015/0323364 A1 | 11/2015 | Sakaguchi et al. |
| 2016/0195418 A1 | 7/2016 | Drachmann et al. |
| 2016/0305807 A1 | 10/2016 | Drachmann |
| 2017/0167904 A1* | 6/2017 | Sathyanarayana ........ G01F 1/66 |
| 2017/0211956 A1 | 7/2017 | Drachmann |

FOREIGN PATENT DOCUMENTS

| | | |
|---|---|---|
| EP | 2270439 A1 | 1/2011 |
| EP | 2278281 A1 | 1/2011 |
| EP | 2447681 A2 | 5/2012 |
| EP | 3037790 A1 | 6/2016 |
| EP | 3130407 A1 | 2/2017 |
| EP | 3199931 A1 | 8/2017 |
| EP | 3211386 A1 | 8/2017 |

* cited by examiner

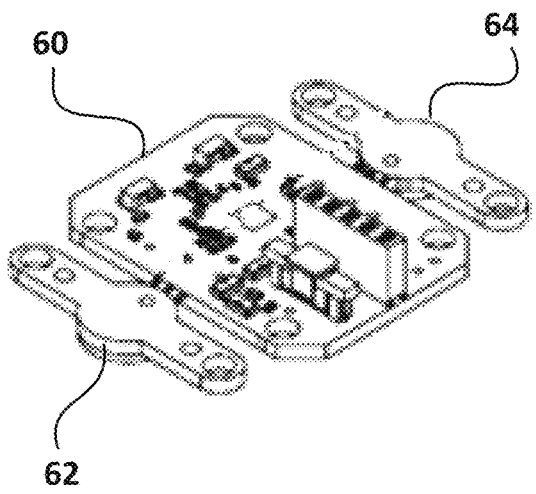
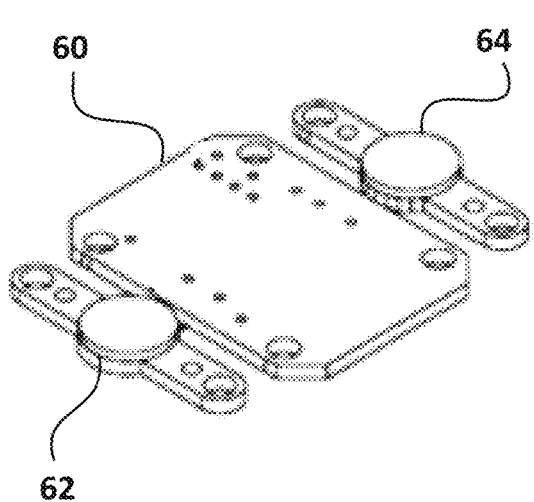
FIG. 4A  FIG. 4B
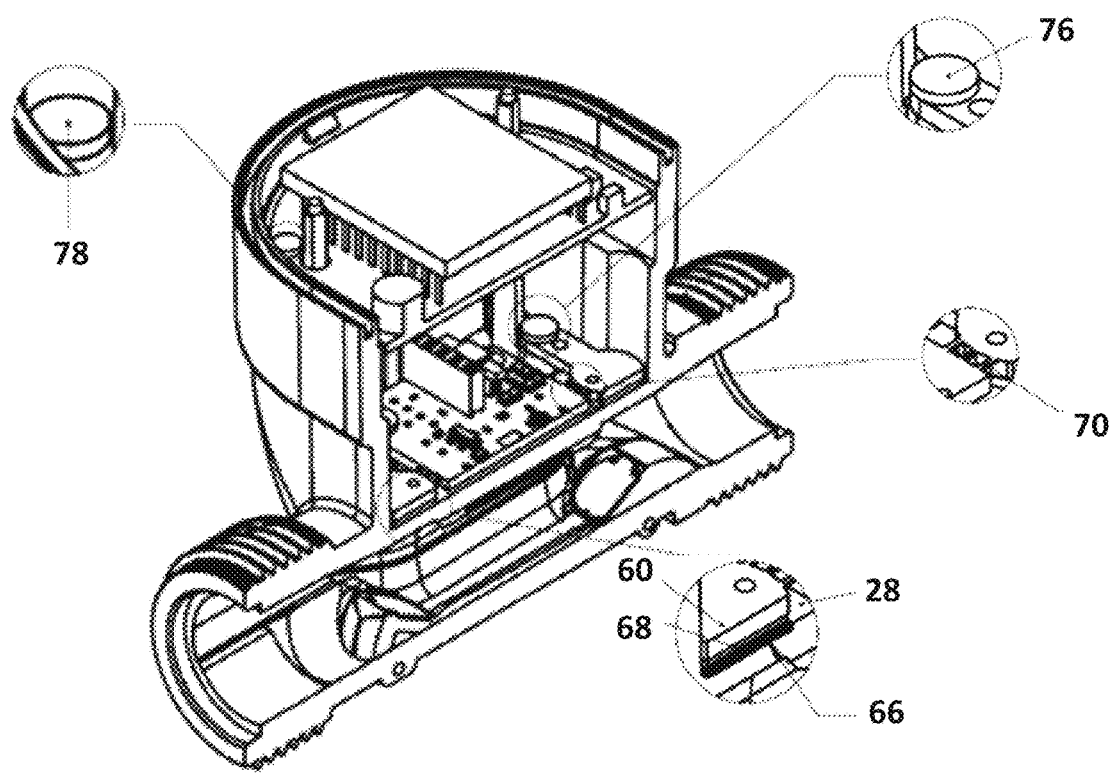
FIG. 5

ULTRASONIC FLOWMETER

FIELD OF THE INVENTION

The present invention relates to an ultrasonic flow meter. More specifically, the invention relates a flow meter employing two ultrasound transducers with a reflector assembly that are employed to obtain various sequences of time-of-flight measurements to accurately calculate flow.

BACKGROUND OF THE INVENTION

As is well known in the art, ultrasonic flow meters are devices that measure the velocity of a fluid, such as water, flowing therethrough with ultrasound to calculate the volumetric flow rate of the fluid. Often, these flow meters accomplish this by measuring the difference between the time-of-flight of ultrasonic pulses transmitted upstream and downstream relative to the direction of fluid flow.

One challenge for existing flow meters is that the zero of the flow meter may drift slightly, for example, due to deterioration of the components over time. Because the flow meter may cease to be properly calibrated as a result of this zero-drift effect, the measurements made by the flow meter will become skewed.

Another challenge for existing flow meters is that the supply of fluid flowing through the flow meter will sometimes change. This dynamic change can result in dynamic error, further compromising the accuracy of the measurements of the flow meter.

What is desired, therefor, is a flow meter that can adapt for a zero-drift effect. What is further desired is a flow meter that can adapt for dynamic changes in the fluid supply.

SUMMARY OF THE INVENTION

Accordingly, it is an object of the present invention to provide a flowmeter that can perform time-of-flight measurements of ultrasound through a fluid in a manner that is not vulnerable to the effect of zero drift.

It is also an object of the present invention to provide a flow meter that can measure very fast changes in the flow of the fluid.

In order to overcome the deficiencies of the prior art and to achieve at least some of the objects and advantages listed, the invention comprises a an ultrasonic flow meter for measuring the flow of a fluid, including a flow tube through which a fluid to be measured flows, a first transducer positioned to transmit an ultrasonic pulse through the fluid flowing through the flow tube, a second transducer positioned to transmit another ultrasonic pulse through the fluid flowing through the flow tube, and a reflector assembly disposed in the flow tube, the reflector assembly configured to reflect the ultrasonic pulse transmitted by the first transducer to the second transducer to provide an upstream pulse having an upstream time time-of-flight, and to reflect the ultrasonic pulse transmitted by the second transducer to the first transducer to provide a downstream pulse having a downstream time-of-flight. A microcontroller is in communication with the first and second transducers such that the microcontroller causes the first and second transducers to transmit the upstream and downstream ultrasonic pulses and generates a measurement of the upstream time-of-flight and the downstream time-of-flight, and the microcontroller obtains a plurality of sequences of said measurement, each sequence comprising at least three measurements of the upstream and downstream time-of-flights, the at least three measurements being of the same measurement type selected from the group of: (a) the time between consecutive rising edges of a pulse emitted from the first transducer and reflected by the reflector assembly to the second transducer, and the time between consecutive rising edges of a subsequent pulse emitted from the second transducer and reflected by the reflector assembly to the first transducer, (b) the time between consecutive falling edges of a pulse emitted from the second transducer and reflected by the reflector assembly to the first transducer, and the time between consecutive falling edges of a subsequent pulse emitted from the first transducer and reflected by the reflector assembly to the second transducer, (c) the time between consecutive rising edges of a pulse emitted from the second transducer and reflected by the reflector assembly to the first transducer, and the time between consecutive rising edges of a subsequent pulse emitted from the first transducer and reflected by the reflector assembly to the second transducer, and (d) the time between consecutive falling edges of a pulse emitted from the first transducer and reflected by the reflector assembly to the second transducer, and the time between consecutive falling edges of a subsequent pulse emitted from the second transducer and reflected by the reflector assembly to the first transducer, where each of said sequences has time-of-flight measurements of a different type than the time-of-flight measurements of the other said sequences. For each of the plurality of sequences, the microcontroller filters said sequence by removing the longest time-of-flight and the shortest time-of-flight from the upstream time-of-flights in said sequence, and removing the longest time-of-flight and the shortest time-of-flight from the downstream time-of-flights in said sequence. The microcontroller calculates the average upstream time-of-flight from the remaining upstream time-of-flights in the plurality of sequences, and calculates the average downstream time-of-flight from the remaining downstream time-of-flights in the plurality of sequences, after filtering said plurality of sequences; and the microcontroller further calculates the volumetric flow rate based on the average upstream time-of-flight and the average downstream time-of-flight.

In certain advantageous embodiments, the microcontroller obtains a sequence employing measurement type (a), a sequence employing measurement type (b), a sequence employing measurement type (c), and a sequence employing measurement type (d).

In some embodiments, each sequence obtained by the microcontroller comprises five measurements of the upstream and downstream time-of-flights. In other embodiments, each sequence obtained by the microcontroller comprises seven measurements of the upstream and downstream time-of-flights, and wherein, for each of the plurality of sequences, the microcontroller further removes the second longest time-of-flight and the second shortest time-of-flight from the upstream time-of-flights in said sequence, and further removes the second longest time-of-flight and the second shortest time-of-flight from the downstream time-of-flights in said sequence.

In certain advantageous embodiments, the reflector assembly includes a reflector housing disposable in the flow tube, the reflector housing comprising a bottom portion having a middle, first and second ends, a first reflecting surface at the first end and inclined toward the middle, and a second reflecting surface at the second end and inclined toward the middle, and a top portion having a third reflecting surface positioned such that the third reflecting surface reflects the ultrasonic pulses transmitted by the first transducer, and reflected by the first reflecting surface, to the second reflecting surface, and the third reflecting surface reflects the ultrasonic pulses transmitted by the second transducer and reflected by the second reflecting surface to the first reflecting surface.

In some of these embodiments, the bottom and top portions have arcuate inner walls that together define a substantially circular channel in the reflector housing. In some cases, the first end of the bottom portion of the reflector assembly has a notch, and wherein the flow tube has an inner wall with a protuberance that engages the notch when the reflector assembly is inserted in the flow tube. In some instances, the first, second, and third reflecting surfaces comprise stainless-steel. In some cases, the first and second reflecting surfaces are affixed to the bottom portion of the reflector housing via overmolding.

In certain embodiments, the invention flow meter further includes a housing in which the first and second transducers and the microcontroller are disposed, the housing having an upper surface along the perimeter thereof with a groove therein, and a cover having a protuberance along the perimeter thereof disposed in the groove, wherein the protuberance is secured in the groove with an ultraviolet-cured glue.

In certain embodiments, the first and second transducers comprise piezoceramic discs.

In some cases, the flow tube does not have a temperature measurement channel.

In some embodiments, the microcontroller causes the first and second transducers to transmit the upstream and downstream ultrasonic pulses and generates a measurement of the upstream time-of-flight and the downstream time-of-flight every 500 milliseconds.

In certain embodiments, the microcontroller calculates the ultrasound velocity based on the calculated flow rate, and in some of these cases, the microcontroller calculates the temperature of the fluid based on the calculated ultrasound velocity.

BRIEF DESCRIPTION OF THE DRAWINGS

FIG. 4A is a top perspective view of a bottom circuit board of the flow meter of FIGS. 1A-B.

FIG. 4B is a bottom perspective view of the circuit board of FIG. 4A.

FIG. 5 is an exposed, perspective view of the flow meter of FIGS. 1A-B.

DETAILED DESCRIPTION OF THE INVENTION

The following detailed description illustrates the technology by way of example, not by way of limitation, of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1A:
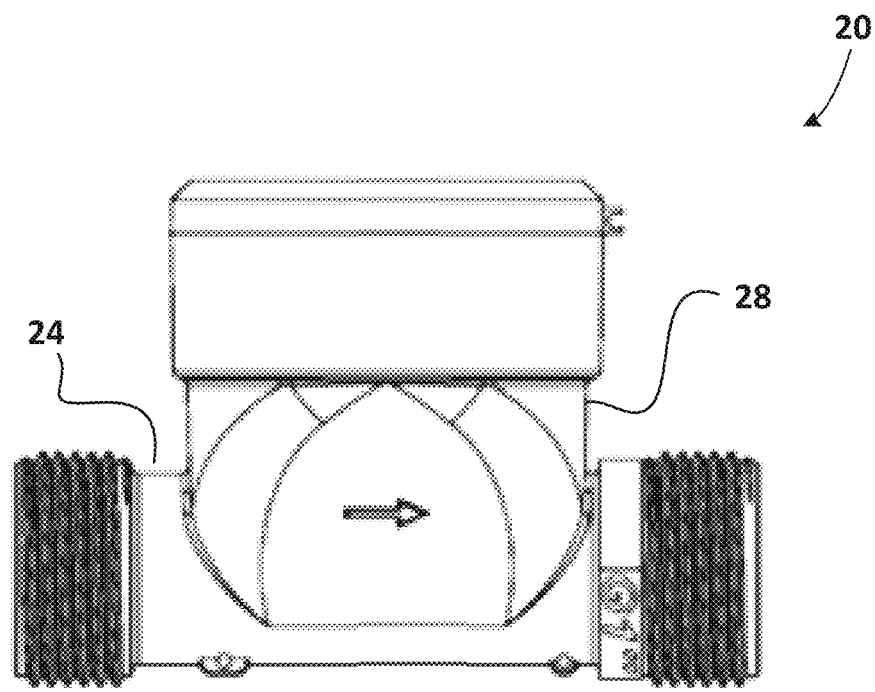
FIG. 1A is a side view of an ultrasonic flow meter in accordance with the invention.
Figure 1B:
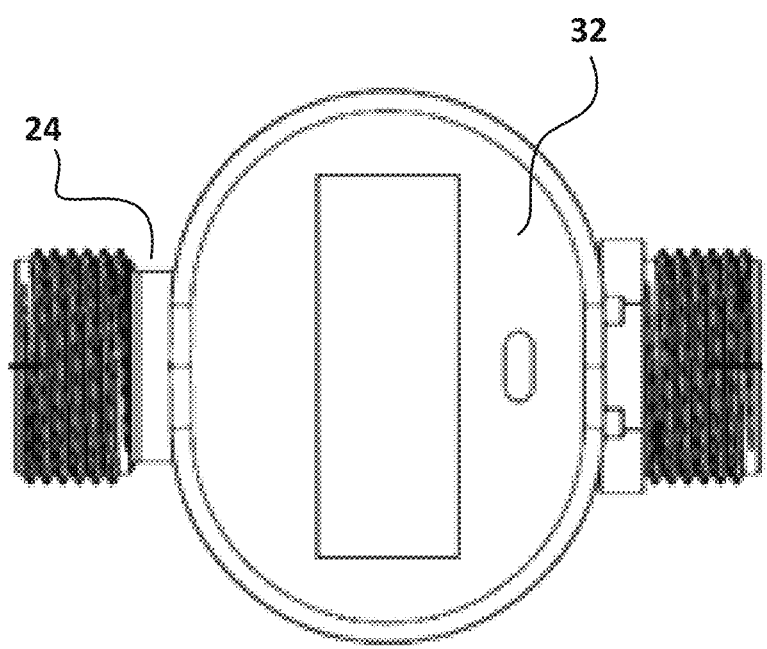
FIG. 1B is a top view of an ultrasonic flow meter of FIG. 1A.

The basic components of one embodiment of an ultrasonic flow meter in accordance with the invention are illustrated in FIG. 1. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention FIGS. 1A-B illustrate one exemplary embodiment of a flow meter (20) in accordance with the invention. The illustrated flow meter (20) includes a flow tube (24), through which water or another liquid flow, and a housing (28) coupled thereto, which houses an electronic system for performing various measurements, as further explained below.

Figure 2A:
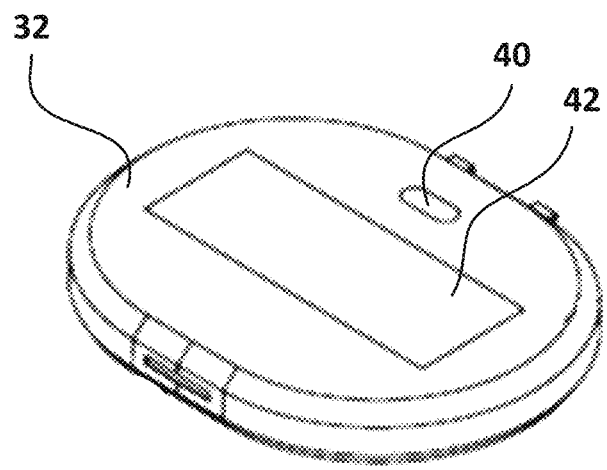
FIG. 2A is a perspective view of the cover of the flow meter of FIGS. 1A-B.
Figure 2B:
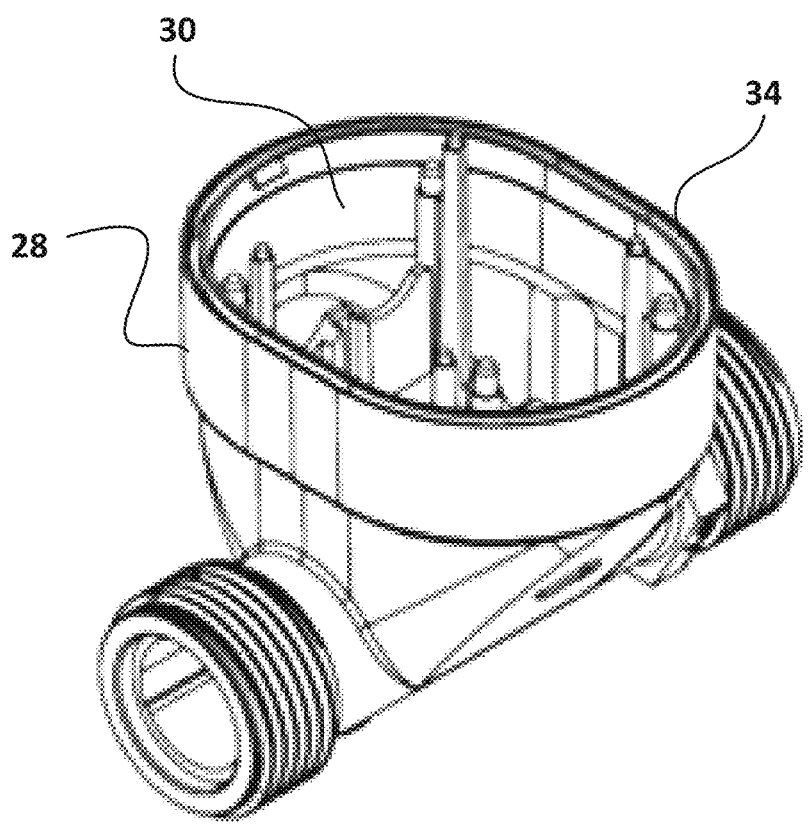
FIG. 2B is a perspective view of the flow meter of FIGS. 1A-B without the cover or internal electronics.

Referring to FIGS. 2A-B, the housing (28) includes a cavity (30) for accommodating the electronic systems, which is enclosed by a cover (32) in order to protect the electronic components and sensors therein from the atmosphere and surrounding water and vapor. The cover (32) has translucent areas (40) and (42), which serves as an LCD display.

Figure 2C:
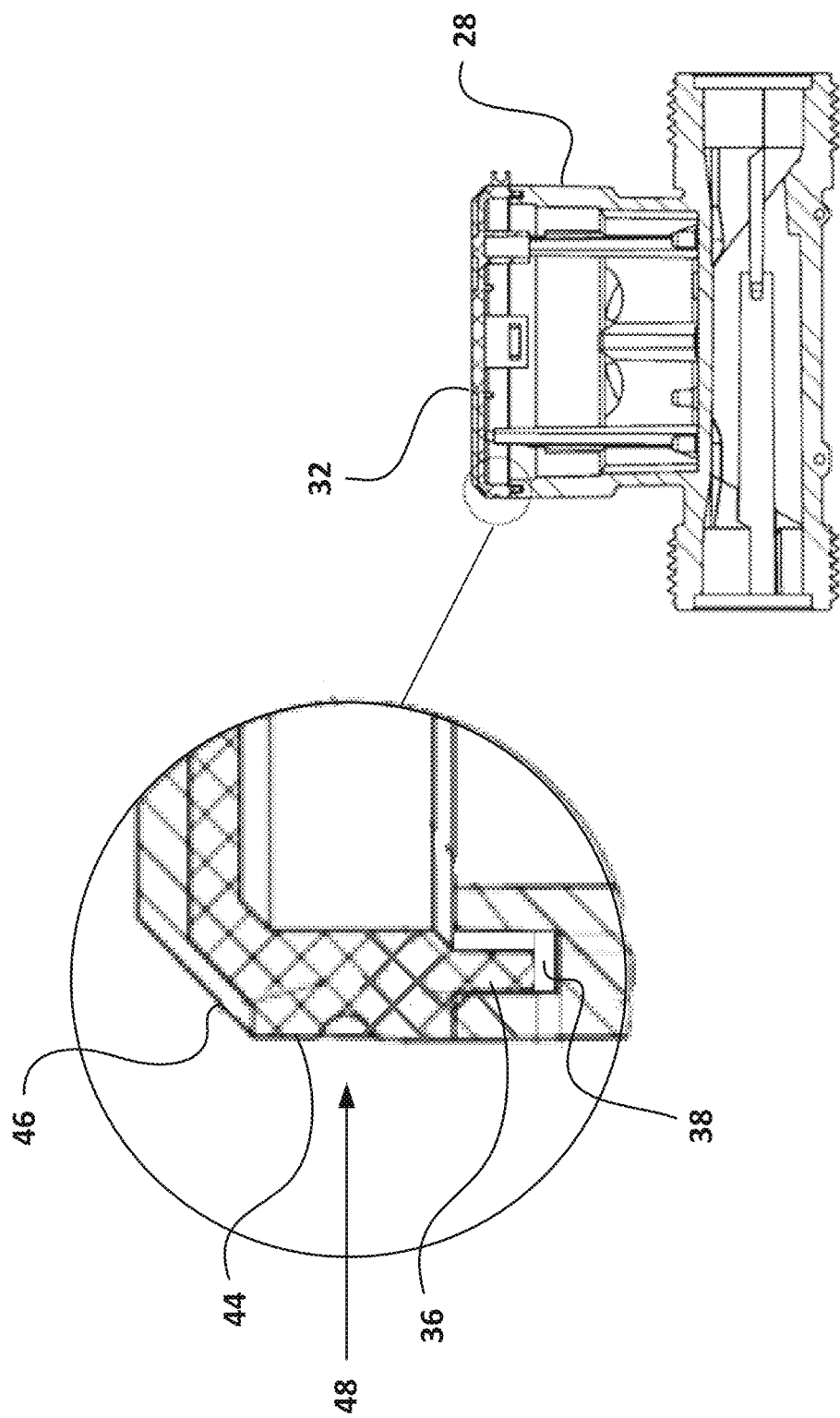
FIG. 2C is a partially cross-sectional view of the flow meter of FIGS. 2A-B.

As shown in FIGS. 2B-C, the top of the housing includes a groove (34) around the perimeter thereof, and the cover has a corresponding protuberance (36) that fits in the groove (34). The groove (34) includes an adhesive (38), such as glue, for securing the cover (32) to the housing (28) and ensuring that the enclosure is sealed. By securing the cover (32) with the glue, unauthorized access to the device is also prevented.

The cover (32) includes a transparent portion (44), which is covered with a colored portion (46), such that the side (48)

of the cover is transparent. In view of this, the glue (38) can be cured rapidly with ultraviolet light.

Figure 3A:
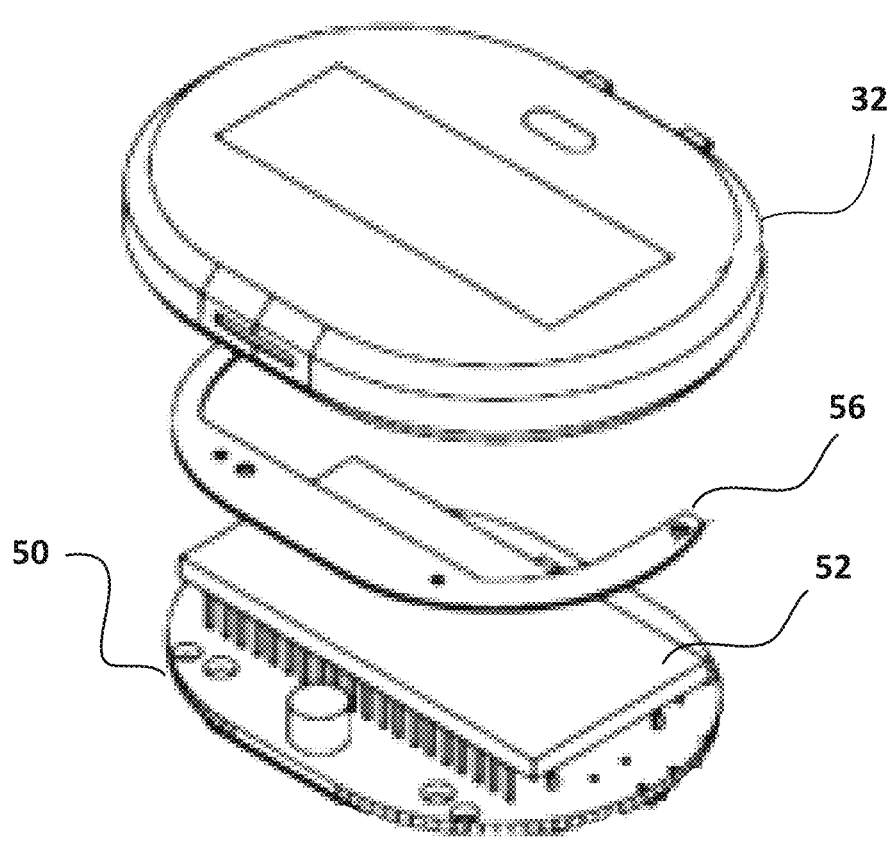
FIG. 3A is perspective view of a cover, antenna, and circuit board of the flow meter of FIGS. 1A-B.
Figure 3B:
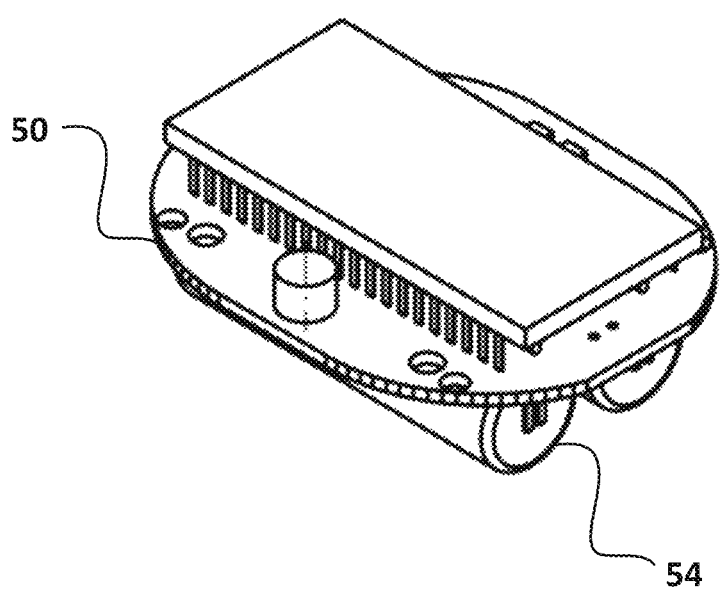
FIG. 3B is a perspective view of the circuit board of FIG. 3A with batteries.
Figure 6:
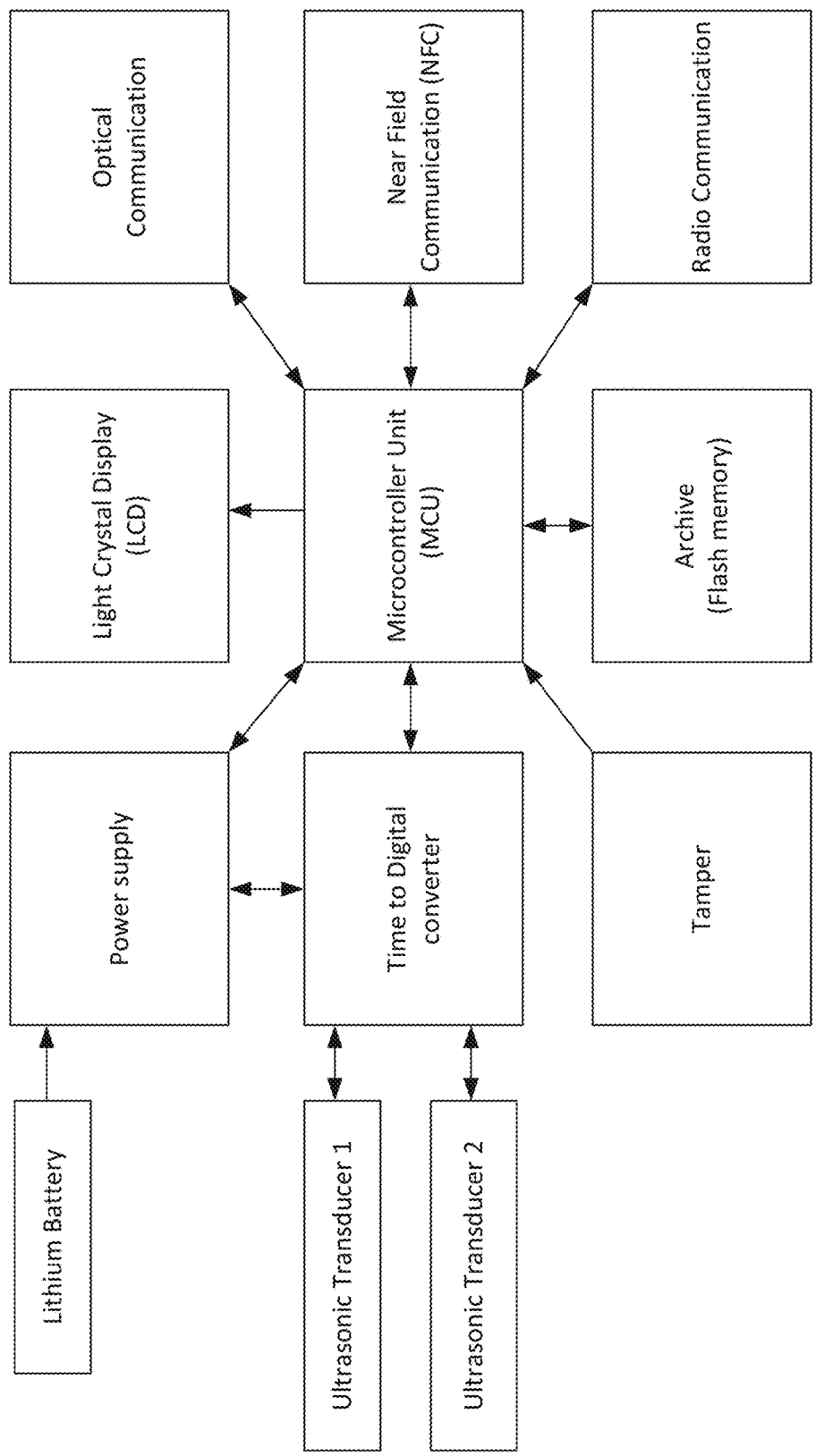
FIG. 6 is block diagram showing the operation of the electronics system illustrated in FIGS. 3-5.

Referring to FIGS. 3-5, the basic components of the electronic system, the operations of which are shown schematically in FIG. 6, are shown. As shown in FIGS. 3A-B, a first (top) printed circuit board (50) is positioned below the cover (32). The circuit board (50) includes a microcontroller (52) for managing various functions, including near field communication, radio communication, optical communication, flash memory storage, and generation of the LCD display. Power is supplied by batteries (54), which are soldered directly to the circuit board (50) in order to avoid risking poor quality electrical contact. A radio antenna (56) made from a printed circuit board is located between the circuit board (50) and cover (32) and is connected to the board (50) via a pin connector.

As shown in FIGS. 4A-B, a second (bottom) printed circuit board (60) for performing time-of-flight measurements is also provided. The second circuit board (60) includes first and second ultrasonic transducers (62), (64). The transducers (62), (64) can comprise piezoceramic discs, which are connected to the circuit board (60) via a flexible wire connection, as described below.

As illustrated in FIG. 5, the first and second printed circuit boards (50), (60) are disposed within the cavity (30) of the housing (28) and connected with a flexible or rigid connector. When board (60) is mounted in the housing (28), the surface (66) to which the transducers (62), (64) are soldered is cleaned via treatment with atmospheric plasma, and each bonding surface is then covered with a piezoceramic disc (68). One side of the disc (68) is connected to the circuit board (60) via a flexible joint (70), which minimizes the mechanical stress thereon resulting from the fact that the thermal expansion parameters of the printed circuit board (60) and the plastic of the housing (28) are different. The other side of the disc (68) is bonded to the wall of the flow tube (24). The thickness of the wall of the flow tube (24) where the transducers (62), (64) reside is tuned to the transducer frequency.

Each transducer (62), (64) is secured in place by melting plastic positioning pins (76). The top circuit board (50) is likewise secured in place via plastic pins (78). By securing the circuit boards to the housing (28) by melting the plastic pins in this way, the use of screws is avoided, thereby minimizing the number of parts and time required to assemble the flow meter.

Figure 7A:
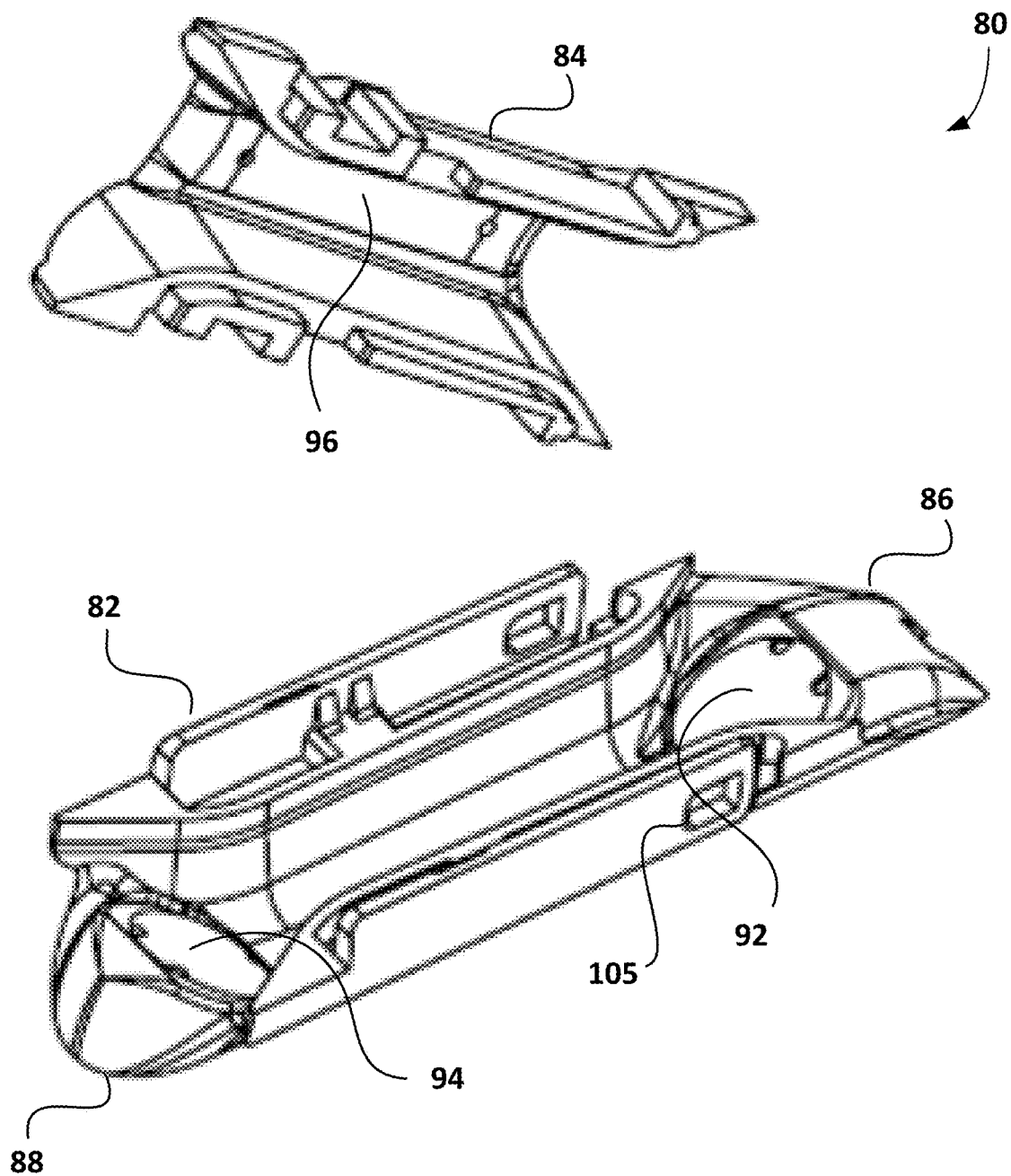
FIGS. 7A-B are perspective views of the top and bottom portions of a reflector assembly of the flow meter of FIGS. 1A-B.

Referring to FIG. 7A, a reflector assembly (80) is shown. The assembly (80) includes a housing with a bottom portion (82) and a top portion (84), which can be made of molded plastic. The bottom portion (82) has a first end (86), a second end (88), and a middle therebetween. A reflector located at the first end (86) has a first reflecting surface (92) inclined toward the middle of the bottom portion (82), while second reflector located at the second end (88) has a second reflecting surface (94), also inclined toward the middle of the bottom portion (82). The top portion (84) includes a third reflector providing a third reflecting surface (96) for reflecting ultrasonic pulses from the first and second reflecting surfaces (92), (94), as further described below. The first, second, and third reflectors may each comprises a stainless-steel reflector affixed to the bottom and top portions (82), (84) via overmolding.

Figure 7B:
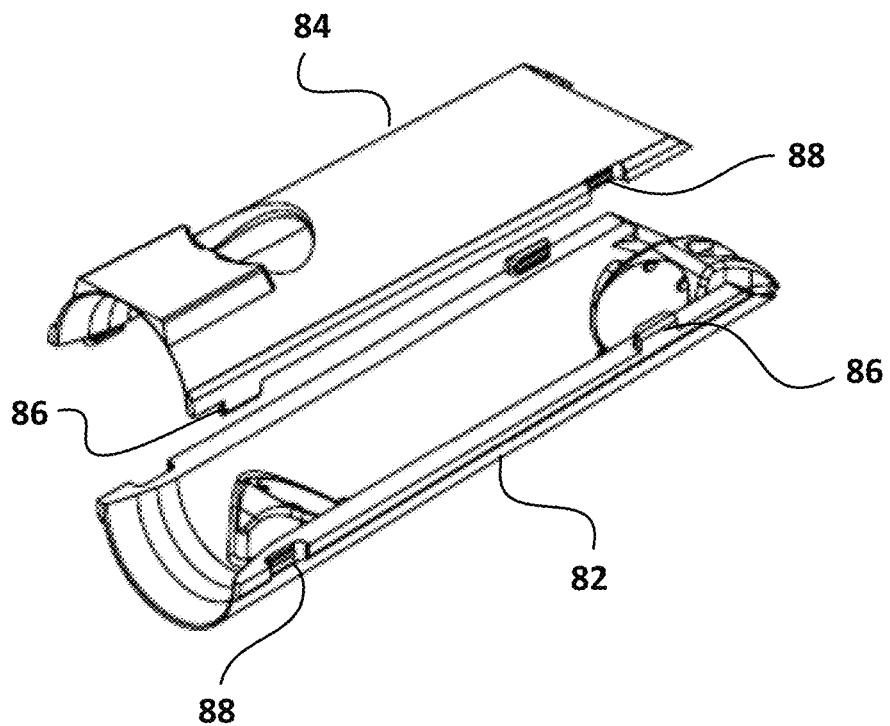
Figure 7C:
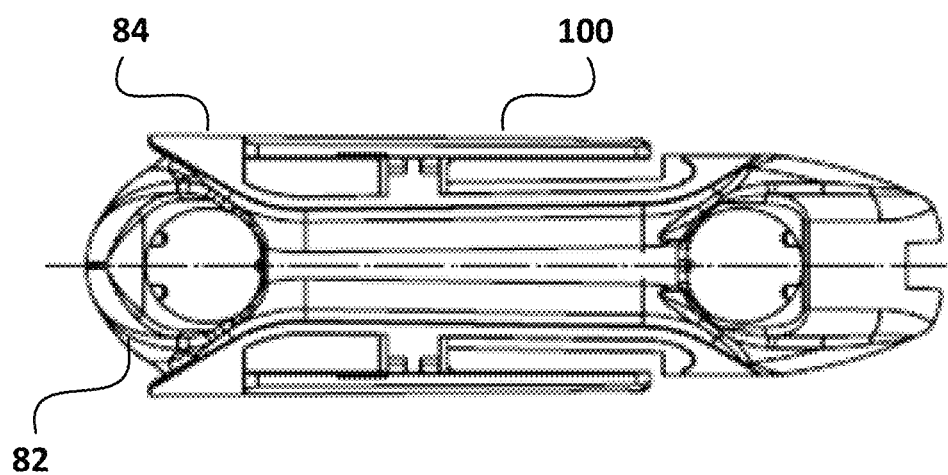
FIG. 7C is a top view of the reflector assembly of FIGS. 7A-B.
Figure 8:
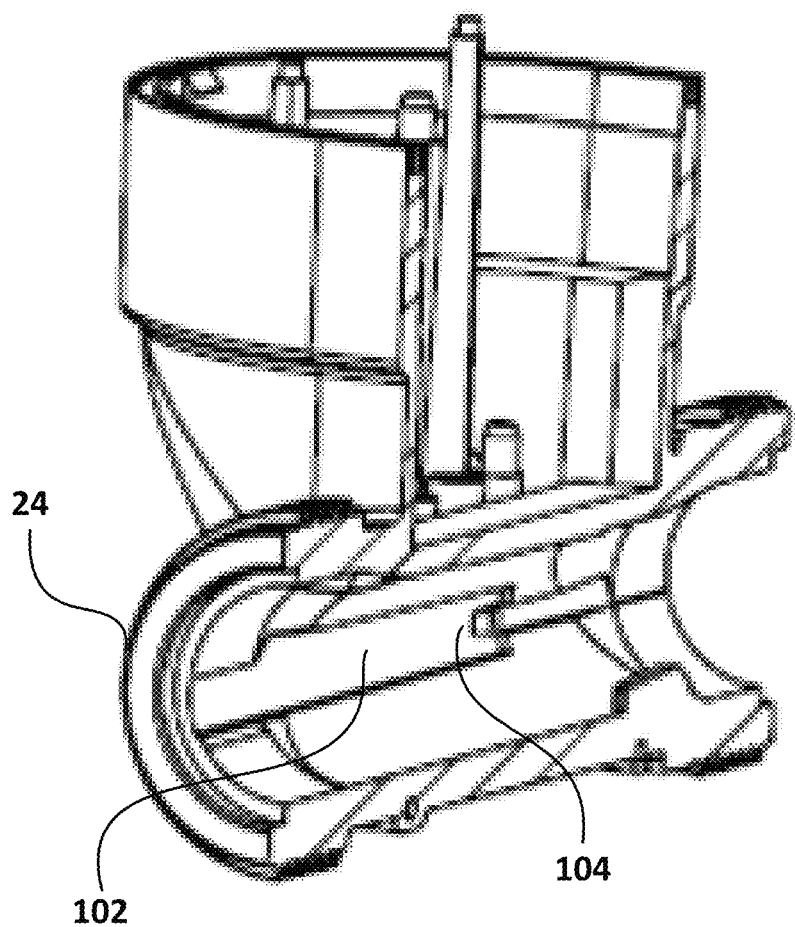
FIG. 8 is an exposed, perspective view of the flow meter of FIG. 2B.

As shown in FIGS. 7B-C, the reflector assembly (80) is assembled by bringing together the top and bottom portions (82), (84) and fitting protuberances (86) on one portion into corresponding apertures (88) of the other portion. When assembled together, ribs on the bottom and top portions (82), (84) collectively provide an elongated projection (100). As shown in FIG. 8, the inner wall of the flow tube (24) includes a channel (102) for accommodating the projection (100) such that, when the reflector assembly (80) is inserted into the flow tube (24), the bottom and top portions (82), (84) are secured together. The flow tube (24) may also include a projection (104) for engaging an aperture (105) of the reflector assembly (80), as shown in FIG. 7A.

Figure 9B:
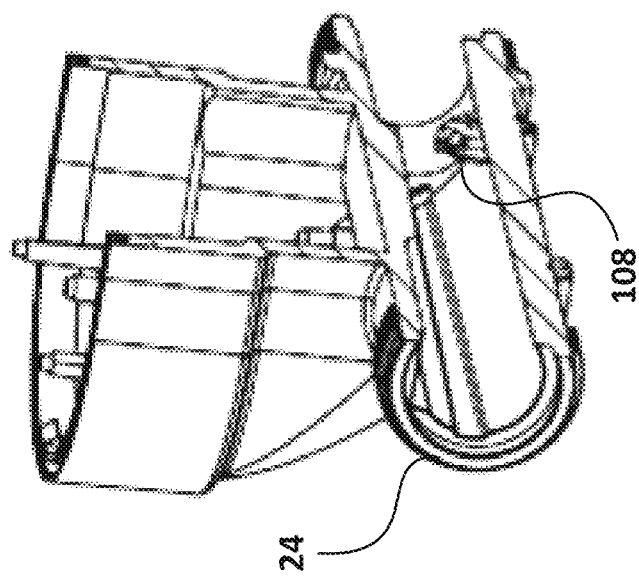
FIG. 9B is an exposed, perspective view of the flow meter of FIG. 2B.
Figure 9A:
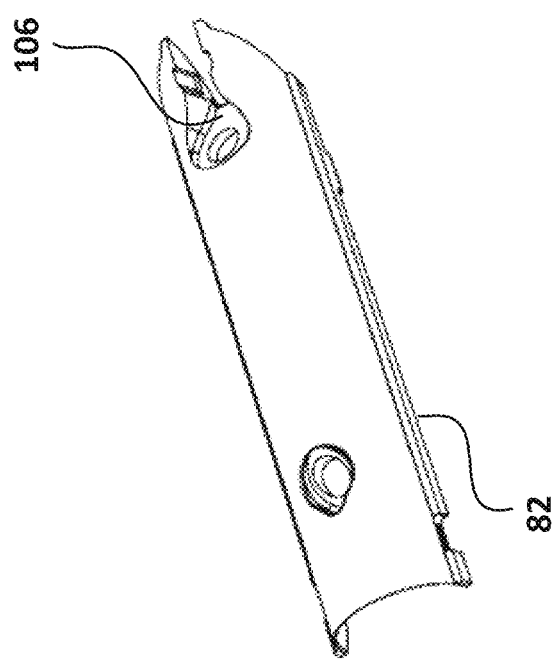
FIG. 9A is a bottom perspective side view of the bottom portion of the reflector assembly of FIGS. 7A-B.

Referring to FIGS. 9A-B, in some cases, the bottom portion (82) has a notch (106) on the underside thereof, and the bottom surface of the flow tube (24) has a corresponding protuberance (108) for engaging the notch (106) and acting as a stop to prevent the reflector assembly (80) from moving in the flow tube (24) as fluid flows therethrough.

It should be noted that any number or variety of such mechanisms for interconnecting the bottom and top portions (82), (84) and the flow tube (24) may be employed.

The bottom portion (82) and the top portion (84) have arcuate inner walls such that, when assembled together, they define a substantially circular channel in the reflector housing.

Figure 10:
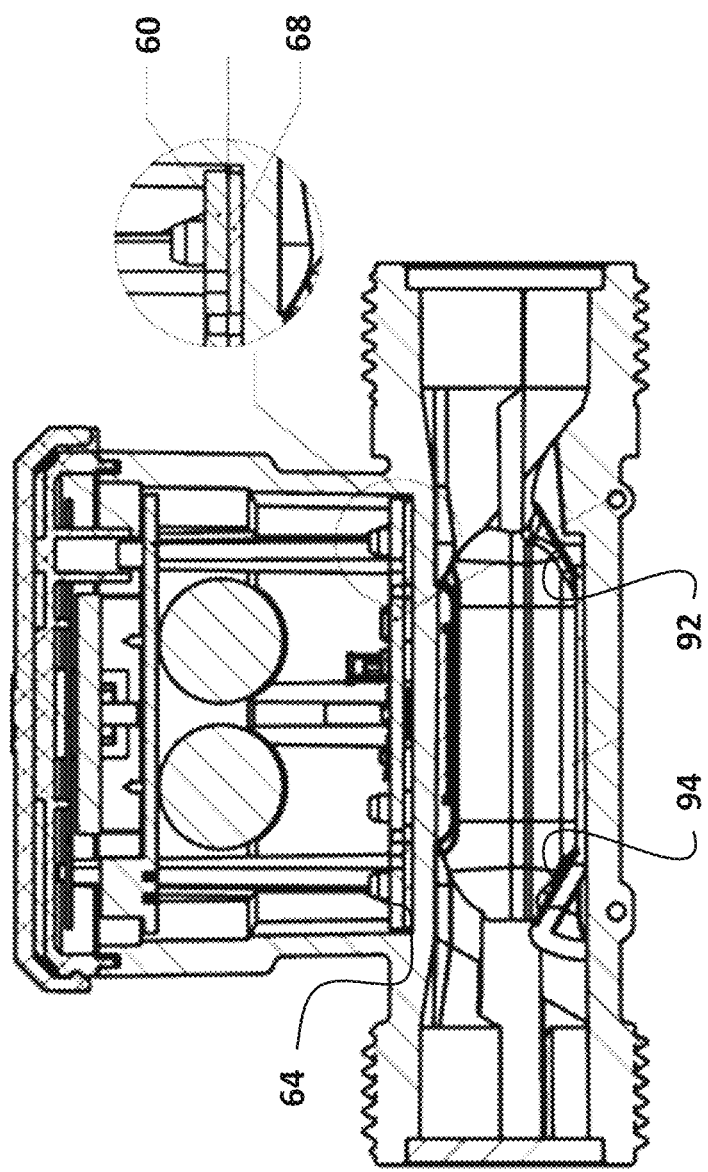
FIG. 10 is a partially cross-sectional view of the flow meter of FIGS. 1A-B.

As shown in FIG. 10, when the reflector assembly (80) is disposed in the flow tube (24), the first transducer (62) is positioned above the first inclined reflecting surface (92), and the second transducer (64) is positioned above the second inclined reflecting surface (94).

Figure 11:
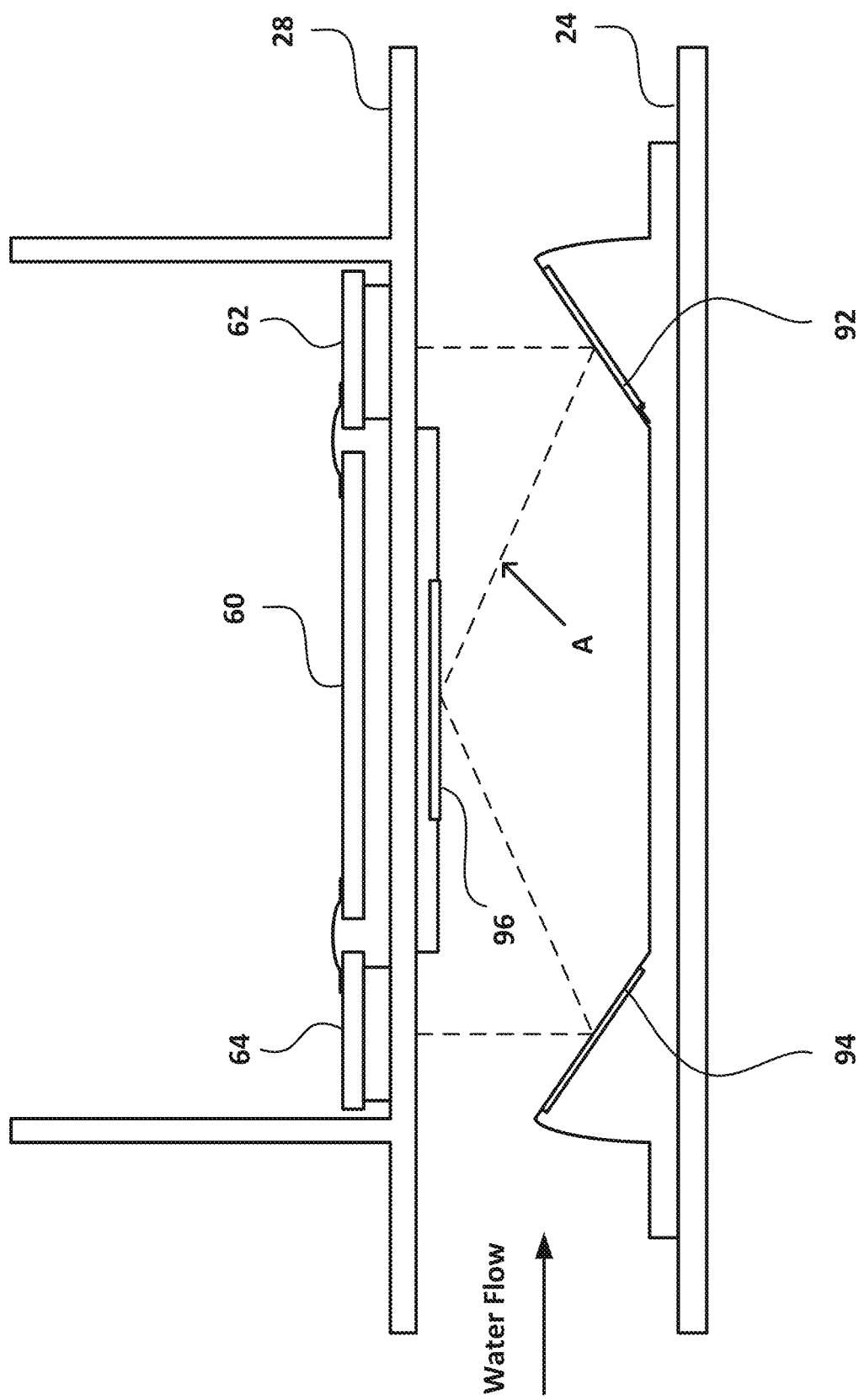
FIG. 11 is a schematic diagram of the operation of the transducers and reflector assembly of the flow meter of FIGS. 1A-B.

The operation of the transducers (62), (64) and reflector assembly (80) is illustrated in FIG. 11. When the first transducer (62) emits an ultrasonic pulse, it is transmitted along a path A, in which it is reflected by the first reflecting surface (92) to the third reflecting surface (96), which reflects it to the second reflecting surface (94), which reflects it to the second transducer (64). By directing the transmission of an ultrasonic pulse from the first transducer (62) in this way, and then converting the signal received at the second transducer (64) via a time-to-digital converter, the microcontroller (52) is able to make an upstream time-of-flight measurement. Similarly, when the second transducer (64) emits an ultrasonic pulse, it is transmitted along the path A in the opposite direction, in which it is reflected by the second reflecting surface (94) to the third reflecting surface (96), which reflects it to the first reflecting surface (92), which reflects it to the first transducer (62). In this way, the microcontroller (52) is able to also make a downstream time-of-flight measurement.

Figure 12:
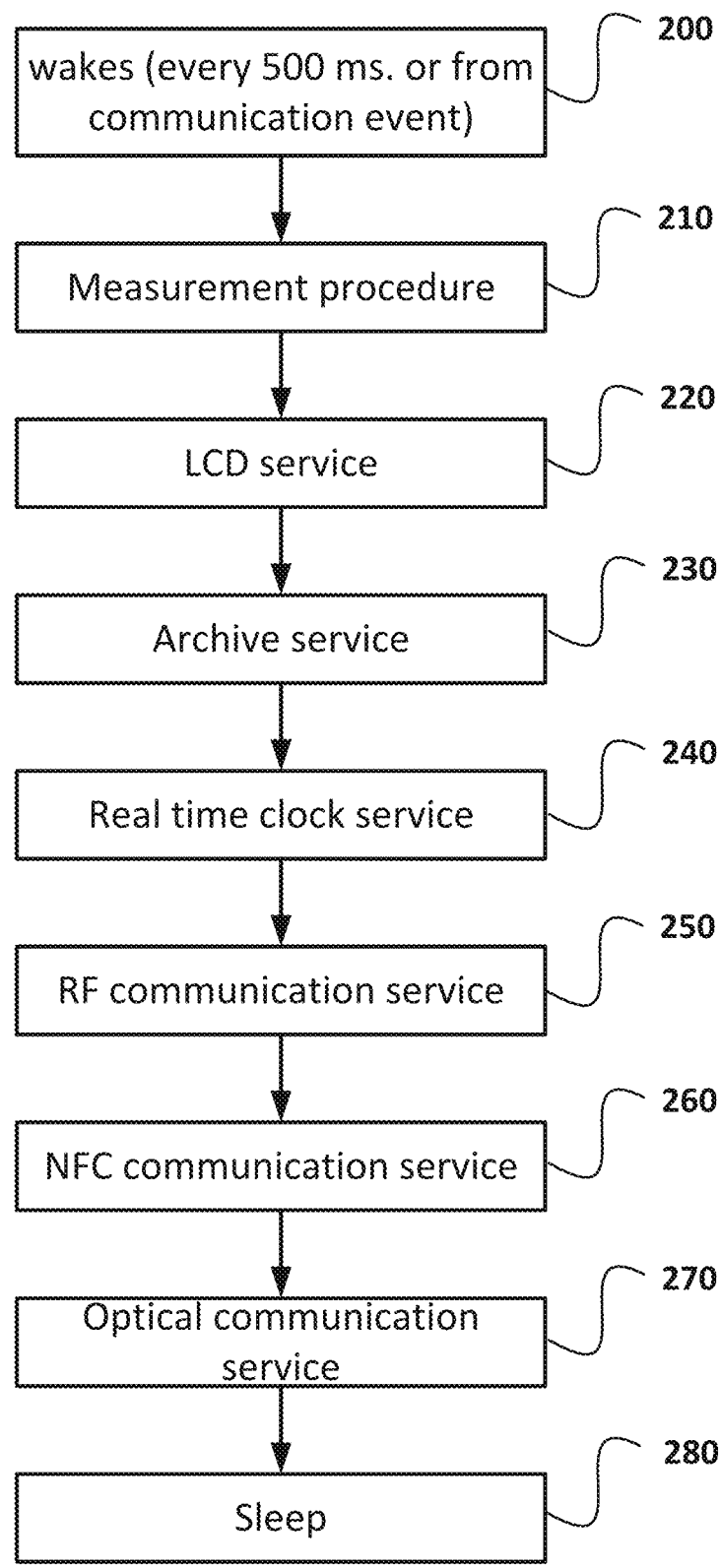
FIG. 12 is a block diagram of the operation of the microcontroller of the flow meter of FIGS. 1A-B.

Referring to FIG. 12, the basic operations of the microcontroller (52) are shown. Each 0.5 seconds, the microcontroller "wakes up" (200). The microcontroller performs a measurement procedure (210), comprising one upstream time-of-flight and one downstream time-of-flight, as further described below. The microcontroller then services various components, which includes LDC service (220), archive service (230), real time clock service (240), radio communication service (250), near field communication service (260), and optical communication service (270). The microcontroller (52) then enters sleep mode (280) in order to minimize power consumption.

Figure 13A:
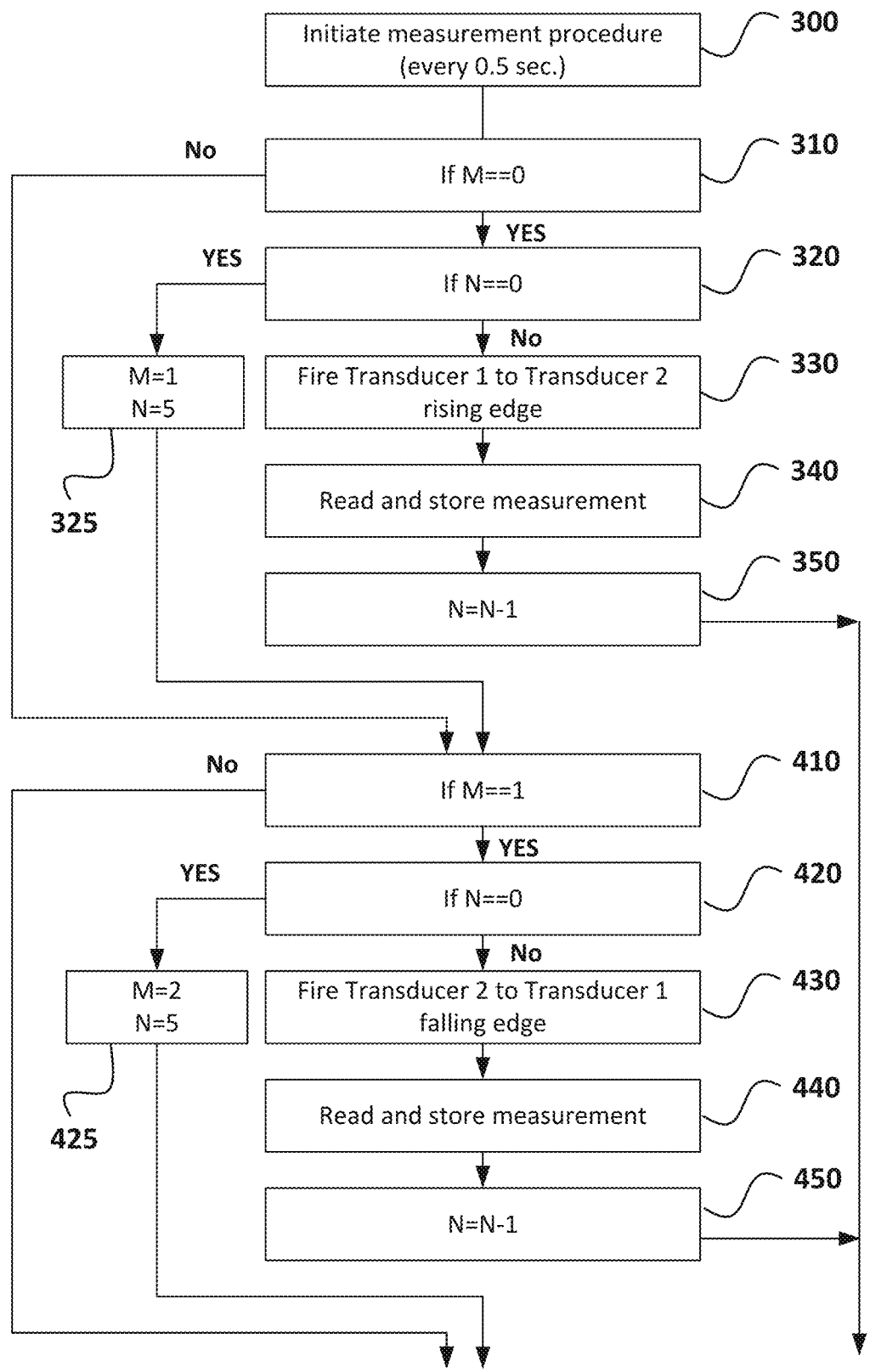
FIGS. 13A-B is a block diagram of the operation of the flow meter employing the measurement procedure of FIG. 12.
Figure 13B:
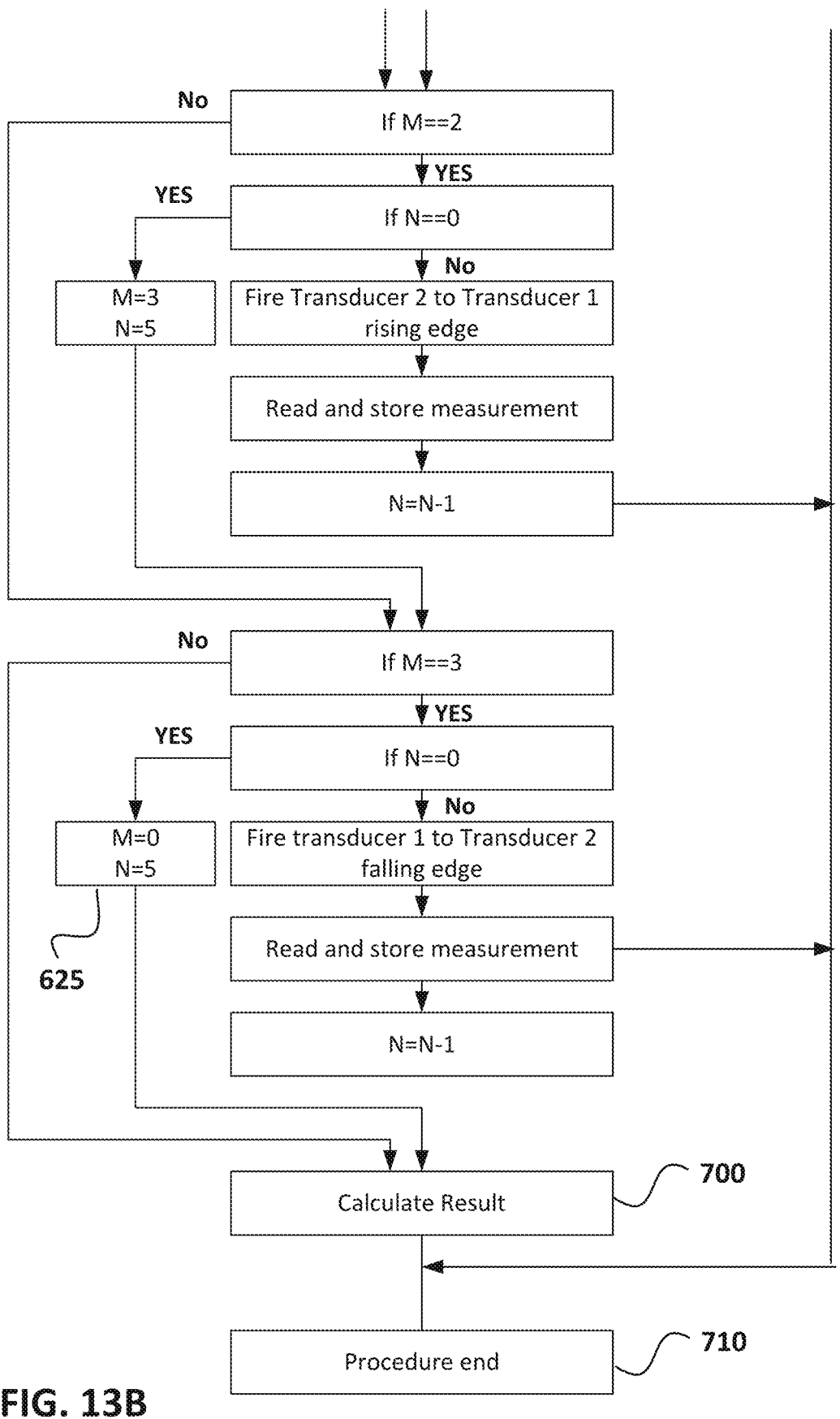

FIGS. 13A-B illustrate the manner in which the microcontroller (52) conducts each measurement procedure in one advantageous embodiment of the invention. In this embodiment, the microcontroller obtains four sequences of measurements (M0 through M3). For each sequence, the microcontroller obtains N measurements, where each measurement is one upstream time-of-flight and one downstream time-of-flight, and stores this in memory.

The measurements in a single sequence are all of the same type. The four measurement types are illustrated in the below table:

| Measurement Type | Ultrasound Transducer Pulse Order | Edge |
|---|---|---|
| 1 | 1 -> 2 short pause (16-20 ms) 2 -> 1 | rising |
| 2 | 2 -> 1 short pause (16-20 ms) 1 -> 2 | falling |
| 3 | 2 -> 1 short pause (16-20 ms) 1 -> 2 | rising |
| 4 | 1 -> 2 short pause (16-20 ms) 2 -> 1 | falling |

For each sequence, the microcontroller makes N measurements before moving on to the next sequence (which then uses a different measurement type). N is at least three, but typically, is five or seven. In the illustrated embodiment, N is five.

Every 500 milliseconds, the microcontroller wakes up and initiates the measurement procedure (300). When beginning the first sequence, M=0 and N=5. The microcontroller confirms that M is 0 (310) and confirms that N is not 0 (320). It then initiates a measurement of Type 1 (330), and reads and stores the measurement (340). It then decreases the value of N by one (350), and ends the current measurement procedure (500), entering sleep mode.

When the microcontroller wakes up again (which it does every 500 ms), it again initiates the measurement procedure. It repeats the same steps, again decreasing the value of N by one (350). In the illustrated example, N is five. Therefore, after the microcontroller has completed the measurement procedure five times, when it checks if N is 0 (320), the answer will be 'yes,' and the microcontroller will change the sequence M to 1 and reset N to 5 (325), and then begin the next sequence (M1).

After checking the values of M and N (410, 420), the microcontroller initiates a measurement of Type 2 (430). The microcontroller reads and stores the measurement (440). It then decreases the value of N by one (450), and ends the current measurement procedure (500), entering sleep mode. As with the prior sequence, the microcontroller repeats these steps each time it wakes until the value of N is 0, at which point, it again resets the values of M and N (425) and moves on to the next sequence (M2).

The microcontroller repeats the same steps using measurements of Type 3 until it moves onto the final sequence (M3). After it completes the final sequence using measurements of Type 4, it resets the value of M to 0 (625) so that the system is ready to repeat the above, and then calculates the result (700).

Figure 14:
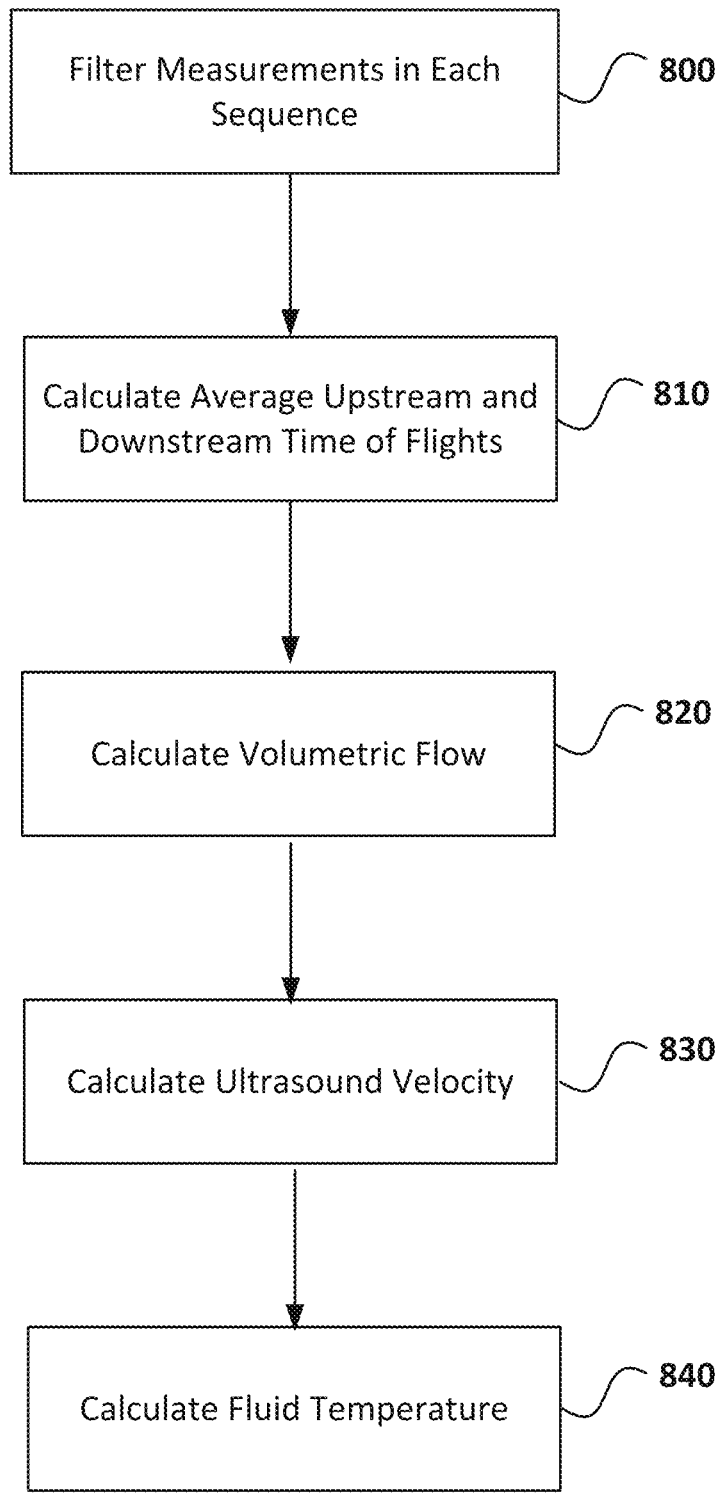
FIG. 14 is a block diagram of the calculations of FIGS. 13A-B.
Figure 15A:
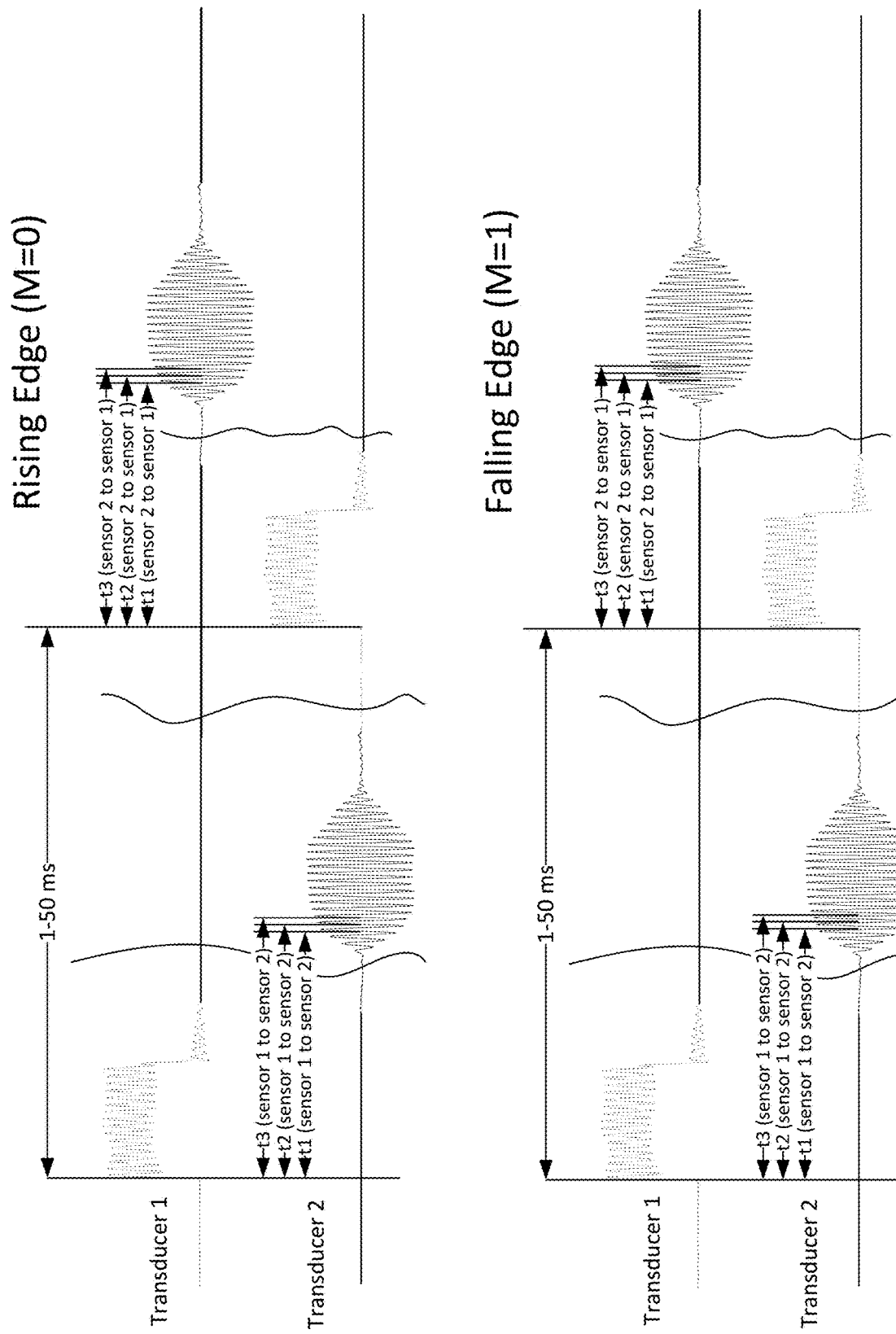
FIGS. 15A-B are diagrams showing experimental results employing the present invention.
Figure 15B:
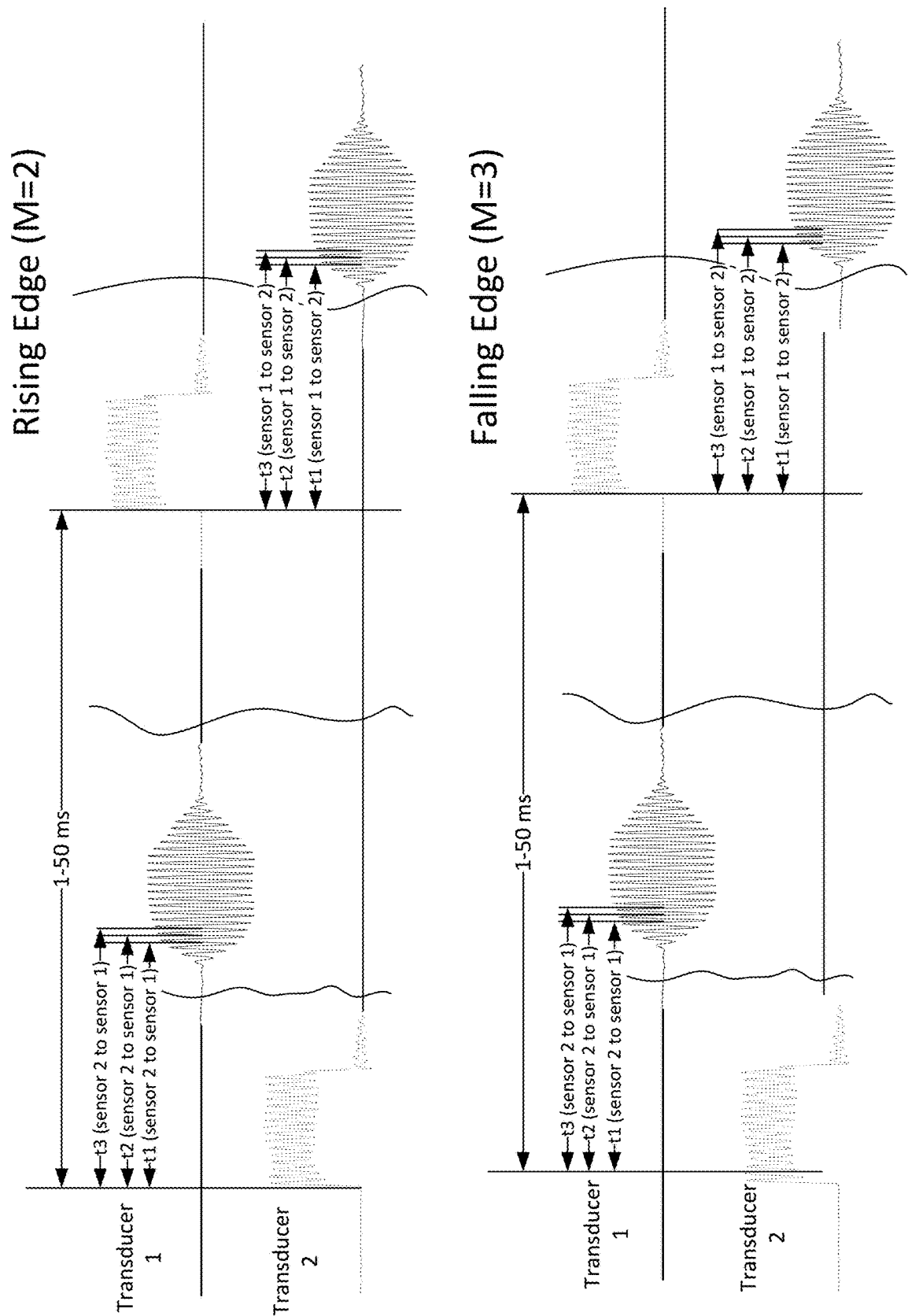

Referring to FIG. 14, the microcontroller first filters (800) the results of each of the sequences. The microcontroller does this by removing the longest time-of-flight and the shortest time-of-flight from the upstream time-of-flights in that sequence, and similarly, removing the longest time-of-flight and the shortest time-of-flight from the downstream time-of-flights in the sequence. For example, in certain cases, each sequence will include five measurements (both upstream and downstream). In those cases, the filtering will typically (though not necessarily) comprise removing just the longest time-of-flight and the shortest time-of-flight. As another example, in some cases, each sequence will include seven measurements. In those cases, the filtering will typically (though not necessarily) comprise removing the two longest and the two shortest time-of-flights.

After filtering the four sequences in this way, the microcontroller (52) calculates (810) the average upstream time-of-flight from the remaining upstream time-of-flights and calculates the average downstream time-of-flight from the remaining downstream time-of-flights. The microcontroller then calculates (820) the volumetric flow in two steps.

First, the microcontroller calculates $flow_{RAW}$ in accordance with the following relationship:

$$flow_{RAW} = Q_f \times \frac{TimeUp - TimeDown}{TimeUp \times TimeDown}$$

Where:

$Q_f$ is a multiplier based on the flow channel dimensions, time measurement units, etc., which is identified by the specific ultrasonic flowmeter's calibration procedure using a comparison of the flow meter's reading with a gold standard flow meter reading for the same nominal flow, and is used to correct for systematic error (bias) of a specific flow meter family as shown in the examples below;

TimeUp is the upstream time-of-flight (measured in picoseconds); and

TimeDown is the downstream time-of-flight (measured in picoseconds). The values of TimeUp and TimeDown may vary anywhere from 30 microseconds to 200 microseconds for different flow meter geometries.

The microcontroller then calculates the real volumetric flow (flow) by correcting $flow_{RAW}$ with a calibration function $Q_{xc}(flow_{RAW})$ in accordance with the following relationship:

$$flow = flow_{RAW} \times Q_{xc}(flow_{RAW})$$

where $Q_{xc}(flow_{RAW})$ is simply a calibration function identified during calibration of the flow meter using a gold standard flow meter. It should be understood that such correction coefficients are determined from $Q_x(flow)$, where $Q_x$ is empirical and is identified using the same procedure as for the identification of $Q_f$, but using different flows from minimal to maximal (not just nominal flow) in order to identify the function $Q_x(flow)$. Values of $Q_{xc}(flow_{RAW})$ are stored in the flow meter's memory and can vary anywhere from 0.1 to 2.0.

Two practical examples of real flow calculations are shown below.

Example 1—High Flow Measurement (Real Flow=4.0 m³/h)

TimeUp=40587900 ps
TimeDown=40000000 ps
$Q_f$=11047724520

$$flow_{RAW} = 11047724520 \times \frac{40587900 - 40000000}{40587900 \times 40000000} = 4.0005 \text{ m}^3/h$$

$Q_{xc}(4.0005)$=0.9999

$$flow = 4.0005 * 0.9999 = 4.00009 \text{ m}^3/h$$

The absolute error of the flow measurement is 4.00009−4.0=9×10⁻⁵ m³/h

Example 2—Low Flow Measurement (Real Flow=0.00969 m³/h)

TimeUp=40294900 ps
TimeDown=40293000 ps
$Q_f$=11047724520

$$flow_{RAW} = 11047724520 \times \frac{40294900 - 40293000}{40294900 \times 40293000} = 0.01292 \; m^3/h$$

$Q_{xc}(0.01292) = 0.75$ flow=0.01292*0.75=0.00969 m³/h

The absolute error of the flow measurement is 0.00969−0.00969=0 m³/h

In some cases, the microcontroller (52) calculates (830) the ultrasound velocity based on the calculated flow rate, and then calculates (840) the temperature of the fluid based on the calculated ultrasound velocity. In view of this, in certain advantageous embodiments, the flow tube (24) does not have a temperature measurement channel since the temperature can be calculated indirectly from the time-of-flight measurements, thereby saving space and reducing the number of components.

It should be understood that the foregoing is illustrative and not limiting, and that obvious modifications may be made by those skilled in the art without departing from the spirit of the invention. Although the invention has been described with reference to embodiments herein, those embodiments do not limit the scope of the invention. Accordingly, reference should be made primarily to the accompanying claims, rather than the foregoing specification, to determine the scope of the invention.

What is claimed is:

1. An ultrasonic flow meter for measuring the flow of a fluid, comprising:
   a flow tube through which a fluid to be measured flows;
   a first transducer positioned to transmit an ultrasonic pulse through the fluid flowing through the flow tube;
   a second transducer positioned to transmit another ultrasonic pulse through the fluid flowing through the flow tube;
   a reflector assembly disposed in the flow tube, the reflector assembly configured to reflect the ultrasonic pulse transmitted by the first transducer to the second transducer to provide an upstream pulse having an upstream time time-of-flight, and to reflect the ultrasonic pulse transmitted by the second transducer to the first transducer to provide a downstream pulse having a downstream time-of-flight;
   a microcontroller in communication with the first and second transducers such that the microcontroller causes the first and second transducers to transmit the upstream and downstream ultrasonic pulses and generates a measurement of the upstream time-of-flight and the downstream time-of-flight;
   wherein the microcontroller obtains a plurality of sequences of said measurement, each sequence comprising at least three measurements of the upstream and downstream time-of-flights, the at least three measurements being of the same measurement type selected from the group of:
     (a) the time between consecutive rising edges of a pulse emitted from the first transducer and reflected by the reflector assembly to the second transducer, and the time between consecutive rising edges of a subsequent pulse emitted from the second transducer and reflected by the reflector assembly to the first transducer,
     (b) the time between consecutive falling edges of a pulse emitted from the second transducer and reflected by the reflector assembly to the first transducer, and the time between consecutive falling edges of a subsequent pulse emitted from the first transducer and reflected by the reflector assembly to the second transducer,
     (c) the time between consecutive rising edges of a pulse emitted from the second transducer and reflected by the reflector assembly to the first transducer, and the time between consecutive rising edges of a subsequent pulse emitted from the first transducer and reflected by the reflector assembly to the second transducer, and
     (d) the time between consecutive falling edges of a pulse emitted from the first transducer and reflected by the reflector assembly to the second transducer, and the time between consecutive falling edges of a subsequent pulse emitted from the second transducer and reflected by the reflector assembly to the first transducer,
   wherein each of said sequences has time-of-flight measurements of a different type than the time-of-flight measurements of the other said sequences; and
     wherein, for each of the plurality of sequences, the microcontroller filters said sequence by removing the longest time-of-flight and the shortest time-of-flight from the upstream time-of-flights in said sequence, and removing the longest time-of-flight and the shortest time-of-flight from the downstream time-of-flights in said sequence; and
     wherein the microcontroller calculates the average upstream time-of-flight from the remaining upstream time-of-flights in the plurality of sequences, and calculates the average downstream time-of-flight from the remaining downstream time-of-flights in the plurality of sequences, after filtering said plurality of sequences; and
     wherein the microcontroller calculates the volumetric flow rate based on the average upstream time-of-flight and the average downstream time-of-flight.

2. The ultrasonic flow meter of claim 1, wherein the microcontroller obtains a sequence employing measurement type (a), a sequence employing measurement type (b), a sequence employing measurement type (c), and a sequence employing measurement type (d).

3. The ultrasonic flow meter of claim 1, wherein each sequence obtained by the microcontroller comprises five measurements of the upstream and downstream time-of-flights.

4. The ultrasonic flow meter of claim 3, wherein the microcontroller obtains a sequence employing measurement type (a), a sequence employing measurement type (b), a sequence employing measurement type (c), and a sequence employing measurement type (d).

5. The ultrasonic flow meter of claim 1, wherein each sequence obtained by the microcontroller comprises seven measurements of the upstream and downstream time-of-flights, and wherein, for each of the plurality of sequences, the microcontroller further removes the second longest time-of-flight and the second shortest time-of-flight from the upstream time-of-flights in said sequence, and further removes the second longest time-of-flight and the second shortest time-of-flight from the downstream time-of-flights in said sequence.

6. The ultrasonic flow meter of claim 5, wherein the microcontroller obtains a sequence employing measurement type (a), a sequence employing measurement type (b), a sequence employing measurement type (c), and a sequence employing measurement type (d).

7. The ultrasonic flow meter of claim 1, wherein the reflector assembly includes a reflector housing disposable in the flow tube, the reflector housing comprising:

a bottom portion having a middle, first and second ends, a first reflecting surface at the first end and inclined toward the middle, and a second reflecting surface at the second end and inclined toward the middle; and a top portion having a third reflecting surface positioned such that the third reflecting surface reflects the ultrasonic pulses transmitted by the first transducer, and reflected by the first reflecting surface, to the second reflecting surface, and the third reflecting surface reflects the ultrasonic pulses transmitted by the second transducer and reflected by the second reflecting surface to the first reflecting surface.

8. The ultrasonic flow meter of claim 7, wherein the bottom and top portions have arcuate inner walls that together define a substantially circular channel in the reflector housing.

9. The ultrasonic flow meter of claim 7, wherein the first end of the bottom portion of the reflector assembly has a notch, and wherein the flow tube has an inner wall with a protuberance that engages the notch when the reflector assembly is inserted in the flow tube.

10. The ultrasonic flow meter of claim 7, wherein the first, second, and third reflecting surfaces comprise stainless-steel.

11. The ultrasonic flow meter of claim 7, wherein the first and second reflecting surfaces are affixed to the bottom portion of the reflector housing via overmolding.

12. The ultrasonic flow meter of claim 1, further comprising:

a housing in which the first and second transducers and the microcontroller are disposed, the housing having an upper surface along the perimeter thereof with a groove therein; and a cover having a protuberance along the perimeter thereof disposed in the groove;

wherein the protuberance is secured in the groove with an ultraviolet-cured glue.

13. The ultrasonic flow meter of claim 1, wherein the first and second transducers comprise piezoceramic discs.

14. The ultrasonic flow meter of claim 1, wherein the flow tube does not have a temperature measurement channel.

15. The ultrasonic flow meter of claim 1, wherein the microcontroller causes the first and second transducers to transmit the upstream and downstream ultrasonic pulses and generates a measurement of the upstream time-of-flight and the downstream time-of-flight every 500 milliseconds.

16. The ultrasonic flow meter of claim 1, wherein the microcontroller calculates the ultrasound velocity based on the calculated flow rate.

17. The ultrasonic flow meter of claim 16, wherein the microcontroller calculates the temperature of the fluid based on the calculated ultrasound velocity.

* * * * *